United States Patent [19]
Ho et al.

[11] Patent Number: 5,959,072
[45] Date of Patent: Sep. 28, 1999

[54] WASTEWATER-RECYCLABLE PROCESS FOR PRODUCING A POLYANILINE RESIN POWDER

[75] Inventors: Ko-Shan Ho, Kaohsiung; Tar-Hwa Hsieh, Taipei, both of Taiwan

[73] Assignee: Conpoly Technology Co., Ltd., Kaohsiung, Taiwan

[21] Appl. No.: 09/013,194

[22] Filed: Jan. 26, 1998

[51] Int. Cl.$^6$ .................................................. C08G 73/00
[52] U.S. Cl. .......................... 528/422; 528/210; 528/480; 528/503; 525/540
[58] Field of Search .................................. 528/210, 422, 528/480, 503; 525/540

[56] References Cited

U.S. PATENT DOCUMENTS

| | | | |
|---|---|---|---|
| 5,264,552 | 11/1993 | Abe et al. | 528/422 |
| 5,436,317 | 7/1995 | Järvinen et al. | 528/422 |
| 5,470,505 | 11/1995 | Smith et al. | 252/500 |
| 5,567,355 | 10/1996 | Wessling et al. | 252/500 |
| 5,618,469 | 4/1997 | Harlev et al. | 528/260 |
| 5,728,321 | 3/1998 | Abe et al. | 528/422 |

*Primary Examiner*—P. Hampton-Hightower
*Attorney, Agent, or Firm*—Baker & Botts, LLP

[57] ABSTRACT

A wastewater-recyclable polymerization process for producing a polyaniline-based resin includes: feeding into a reactor an aniline monomer, an acid solution and an oxidizing agent to undergo polymerization so as to produce polyaniline resin particles; filtering the polyaniline resin particles from an acidic aqueous solution formed during the polymerization; neutralizing and drying the polyaniline resin particles to form a powder; recycling the acidic aqueous solution by mixing the acidic aqueous solution in the reactor with a fresh reactant feed which contains the aniline monomer, the acid solution and the oxidizing agent; and permitting the reactant feed to undergo polymerization in the presence of the recycled acidic aqueous solution at room temperature without cooling the reactor.

4 Claims, 9 Drawing Sheets

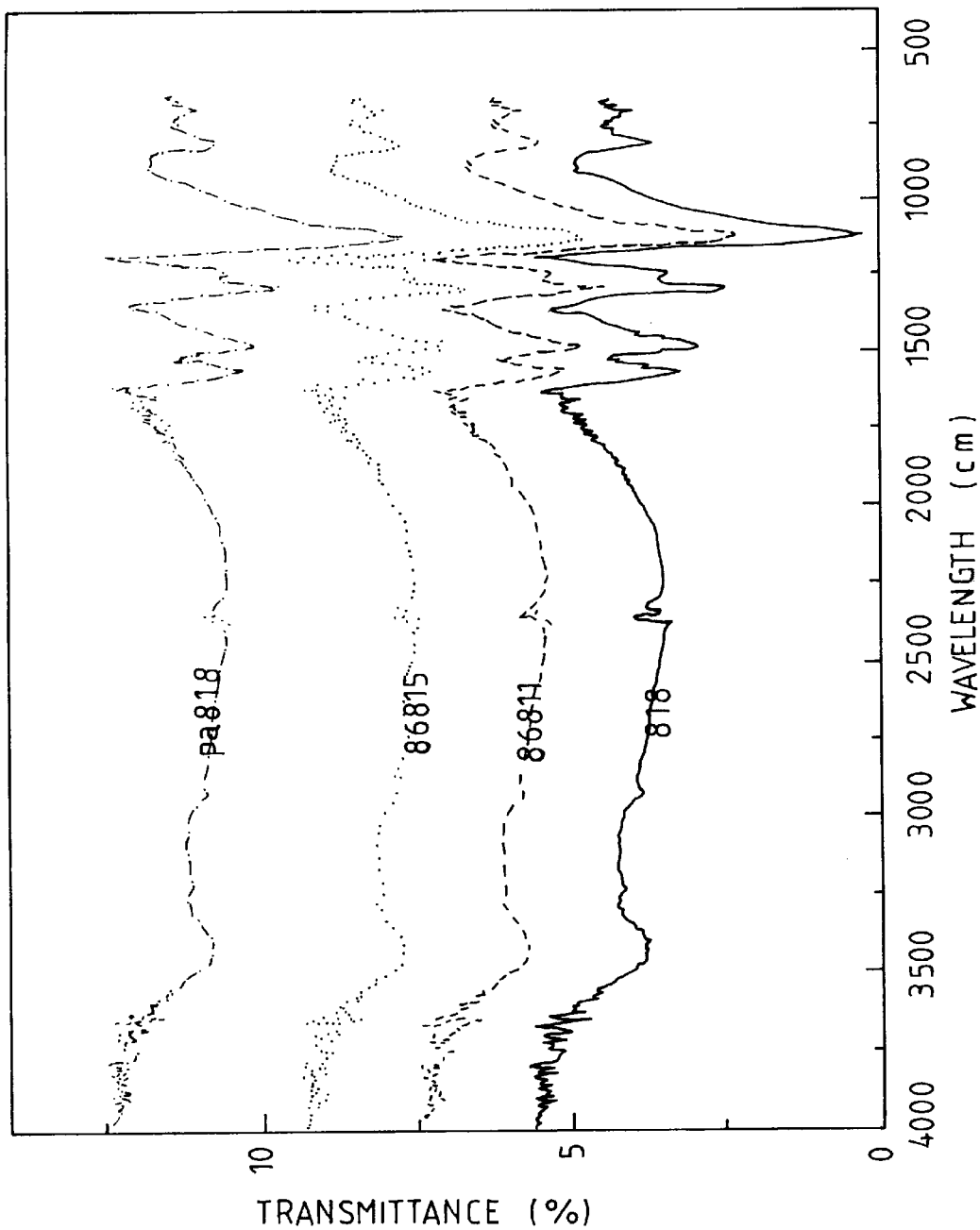

WASTEWATER-RECYCLABLE PROCESS FOR PRODUCING A POLYANILINE RESIN POWDER

BACKGROUND OF THE INVENTION

1. Field of the Invention

This invention relates to a process for producing a polyaniline powder, particularly to a wastewater-recyclable process for producing a polyaniline powder.

2. Brief Description of the Related Prior Art

Referring to FIGS. 1 and 2, a conventional process of producing polyaniline comprise, a feed mixing step 11, a filtering step 12, a neutralizing step 13, a filtering step 14 and a drying and forming step 15. In the mixing step, an aniline monomer, an acid solution and an oxidizing agent (e.g. ammonium persulfate) are constantly mixed in a reactor 21 to undergo a reaction for 2–3 hours. Since the reaction is exothermic, heat is liberated so that a portion of reactants could form into undesirable polymers, thereby decreasing the yield of the desirable product, i.e. polyaniline. In order to eliminate the above drawback, the reactor 21 is cooled as shown in FIG. 2 so as to maintain the temperature of the reaction between 0–5° C. After the reaction, solid polyaniline particles 16 and wastewater 17 are produced in the reactor 21.

In the filtering step 12, the wastewater 17 and the solid particles 16 produced via polymerization are separated through a filter (not shown). The wastewater 17 is usually discarded after separation. In the neutralizing step 13, the solid particles 16 are neutralized by a basic solution. In the second filtering step 14, the neutralized water contained in the solid particles 16 is removed by filtration. In the drying and forming step 15, the solid particles 16 obtained from the second filtering step are dried and formed into a powder. The powder as formed has a large particle size and is electrically conductive. Since the electrically conductive powder particles 16 can form lumps, they should undergo a grinding process for use as a conductive powder. Although the conductive powder 16 as formed can be used as an additive for preparing an electrical conducting material, the following problems are encountered with the conventional process.

(1) Difficult Temperature Control and By-product Formation

An exothermic reaction occurs during the mixing of the reactants. Since it is difficult to know when the heat of reaction is produced and to what level of temperature will be reached, stabilization of the reactants' temperature or accurate maintaining of the temperature between 0–5° C. by mere use of a cooling water system is difficult. As long as the temperature falls out of the range of 0–5° C., undesirable by-products are formed, thereby reducing the yield of the desired product.

(2) Pollution by Wastewater

Since aniline monomers are toxic, although they can be formed into acid salts by mixing with an acid solution in order to avoid toxicity, the amount of the acid solution is high so that a substantial amount of wastewater is produced during the mixing step. The wastewater contains unreacted acid and unreacted monomers, dimers and/or trimers and thus has contaminating colors. If the wastewater is dumped directly, serious pollution can result. Although this problem is solved via a wastewater treatment, the equipment and production costs are high.

(3) Large Particle Size

The conventional method of polymerizing aniline monomers comprises the mixing step, the filtering step, the neutralizing step and the second filtering step, and the solid particles as produced are large as shown in the attached FIG. 6. Accordingly, the solid particles must be ground to small-sized particles before mixing the same with a solvent in order to form a uniformly dispersed conductive paint. If the particle size is large, the powder cannot be easily suspended in the solvent, thereby increasing the difficulty in preparing an electrically conductive paint. Although this problem can be solved by using a suspension agent during the process of powder formation for preventing agglomeration of solid particles, the use of the suspension agent not only increases the material's cost but also results in the need to remove the residual suspension agent.

(4) High Equipment Cost

In addition to the need to provide a waste water treatment as described above, the conventional polymerization process further requires the equipment for water-cooling the reactor so as to maintain the temperature of the reactants, such as, aniline monomer, the acid solution and the oxidizing agent, within the range of 0–5° C. in order to avoid formation other inferior polymerized products. The need to provide the cooling equipment is also one of the reasons that increase the cost of production.

(5) Unreacted wastes

When the aniline monomer, the acid solution and the oxidizing agent are mixed, the acid solution is generally not completely reacted, thus resulting in residual acid solution in the wastewater and wasting of the acid solution.

SUMMARY OF THE INVENTION

An object of the invention is to provide an improved process for producing a polyaniline powder which can alleviate pollution problems while still reducing the cost of production.

According to the present invention, a wastewater-recyclable polymerization process for producing a polyaniline-based powder comprises: feeding into a reactor aniline monomers, an acid solution and an oxidizing agent to undergo polymerization for producing polyaniline solid particles; filtering the polyaniline solid particles from an acidic aqueous solution formed during the polymerization; neutralizing and drying the polyaniline solid particles to form a powder; recycling the acidic aqueous solution by mixing the acidic aqueous solution with a fresh reactant feed which contains the aniline monomer, the acid solution and the oxidizing agent; and permitting the reactant feed to undergo polymerization in the reactor at room temperature in the presence of the recycled acidic aqueous solution without cooling the reactor.

It is surprisingly found that the recycling of the acidic aqueous component, which is usually discarded as wastewater in the conventional process, can eliminate the need to use a cooling system at the cost of a slightly decreasing yield while the desired properties of the polyaniline powder are still maintained.

The exemplary preferred embodiments of the present invention will be described in more detail with reference to the accompanying drawings.

BRIEF DESCRIPTION OF THE DRAWINGS

FIG. 5 is a diagram which shows the results of FTIR tests;

DETAILED DESCRIPTION OF THE PREFERRED EMBODIMENTS

Figure 1:
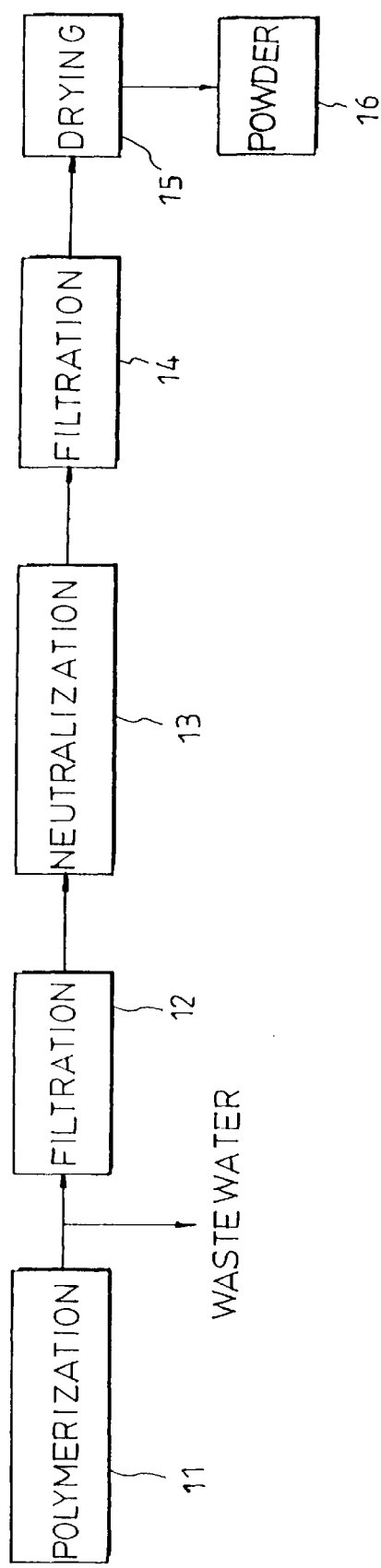
FIGS. 1 and 2 illustrate a convention process.
Figure 2:
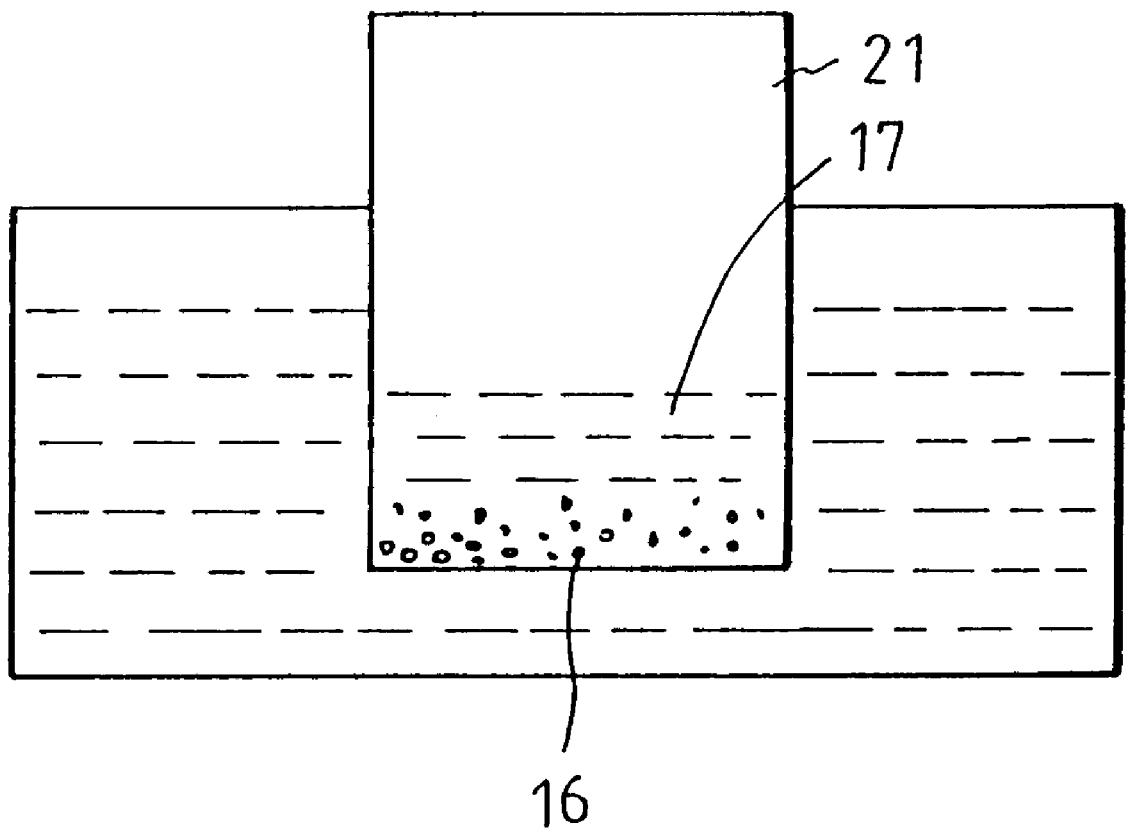
Figure 3:
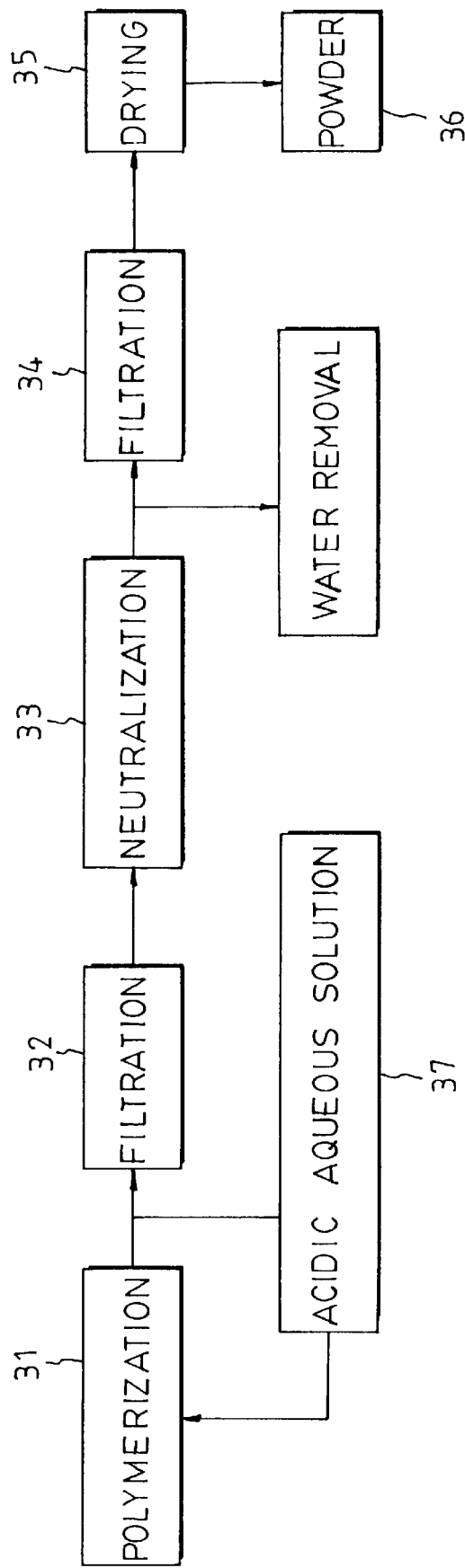
FIG. 3 is a flow diagram illustrating a process according to the present invention.

Referring to FIG. 3, a preferred embodiment of a process for producing a polyaniline-based powder according to the present invention is shown to comprise a reactant mixing step 31, a first filtering step 32, a neutralizing step 33, a second filtering step 34 and a drying and forming step 35. In the reactant mixing step 31, an aniline monomer, an acid solution and an oxidizing agent are mixed in a reactor. The aniline monomer used in the present invention is selected from the group consisting of aniline, alkyl-substituted anilines and alkoxy-substituted anilines. The aniline monomer suitable for the present invention has the general formula

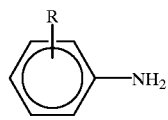

where R is H, $-(CH_2)_nCH_3$ or $-O(CH_2)_nCH_3$ n is 0, 1, or 2.

The oxidizing agent used in the present invention is selected from the group consisting of a salt of persulfonic acid, a salt of sulfuric acid, a salt of iodic acid, and ferric chloride. The acid solution is prepared from a compound which is selected from the group consisting of hydrochloric acid, sulfuric acid, an alkyl benzene sulfonic acid, benzene sulfonic acid, and an alkyl sulfonic acid. The monomer, acid solution and oxidizing agent are mixed in the reactor at room temperature to undergo polymerization. Preferably, the ratio of the monomer, the acid solution and the oxidizing agent are 1:10–25:1–4. The reaction is carried out for about 0.5–4 hours. By the exothermic reaction, polyaniline solid particles are formed in the reactor together with an acidic aqueous solution 37 which contains wastewater, and the unreacted acid solution and aniline monomer. In the filtering step 32, the aqueous solution 37 and the solid particles are separated by means of a filter (not shown). The separated filtrate, i.e. the aqueous solution 37 is returned to the reactor for recycling, i.e. for use in the next batch of polymerization in the reactor. The recycled aqueous solution 37 can reduce the amount of the acid solution to be used in the next batch of polymerization, thereby lowering the cost of reactant materials. Furthermore, the unreacted monomers remaining in the aqueous solution can be reused in the next batch of polymerization. The neutralizing step 33 neutralizes the polyaniline solid particles obtained from the filtering step 32. The second filtering step 34 removes the water from the neutralized polyaniline solid particles. In the drying and forming step 35, the solid particles resulting from the second filtering step 34 are dried, thereby obtaining a conductive polyaniline powder 36 which has a smaller particle size as compared to that of the polyaniline powder produced by the conventional process.

EXAMPLES

A First Batch Polymerization

A reactant feed which contains 100 parts by weight of aniline monomer, 120 parts by weight of an HCl solution and 30 parts by weight of ammonium persulfate were mixed in a reactor to undergo polymerization at room temperature for about 2 hrs. The reaction is expressed as follows:

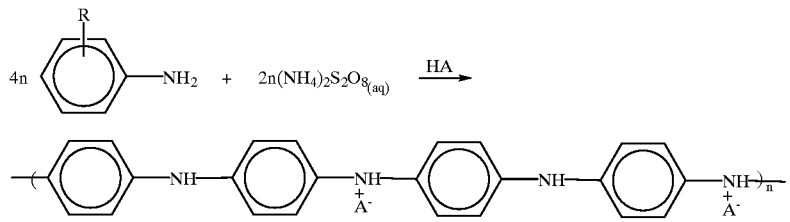

The polyaniline solid particles and the acidic aqueous solution formed in the reactor after the reaction are separated by filtration. The separated acidic solid particles of polyaniline are neutralized by an aqueous sodium hydroxide solution. After neutralization, the resulting polymer has the general formula

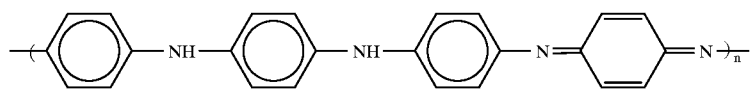

Figure 4A:
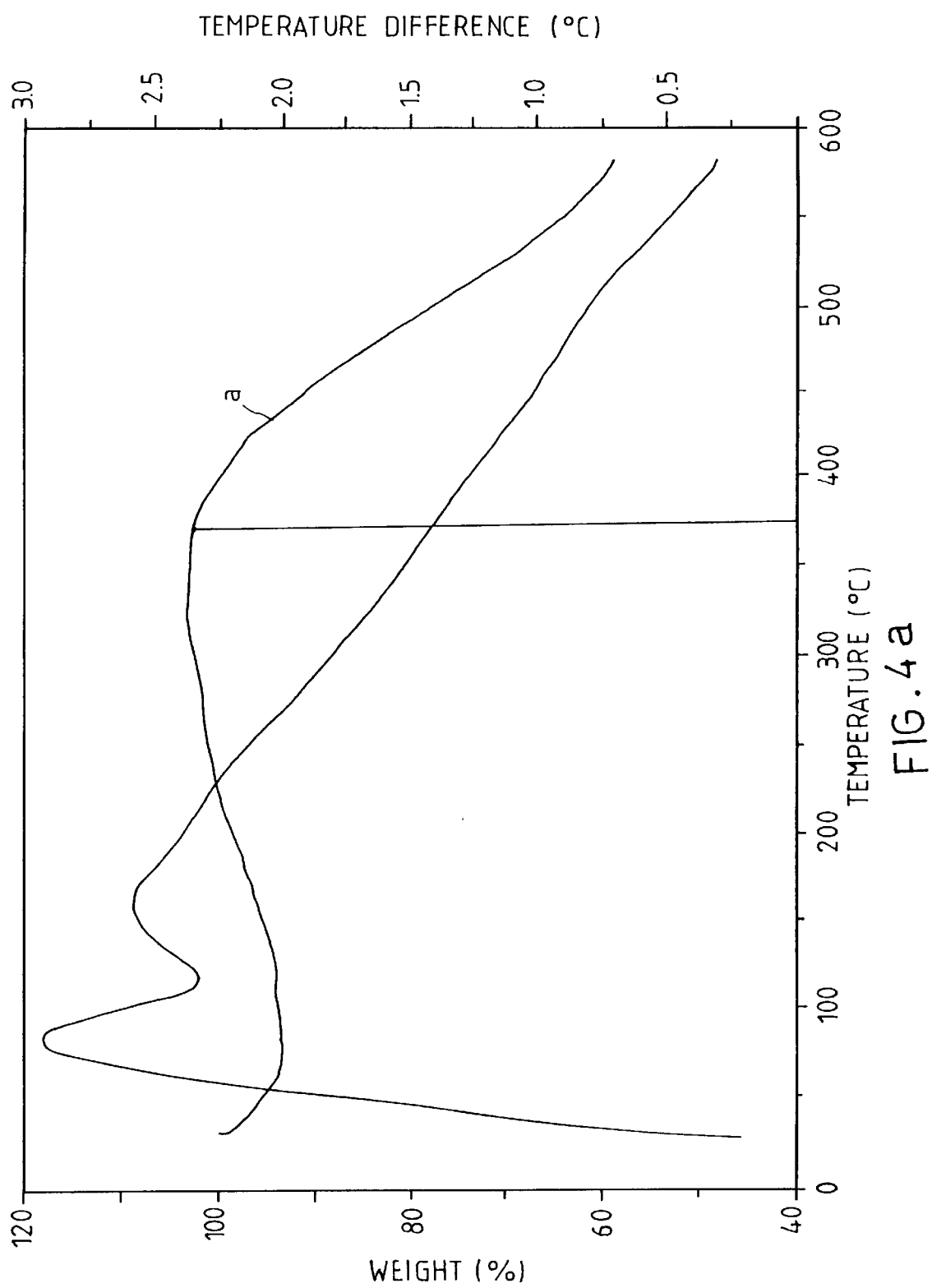
FIGS. 4a to 4d are diagrams which show the results of TGA tests.

The water in the neutralized solid particles was then removed via a second filtering step. Finally, the solid polyaniline particles were dried and formed into a conductive polyaniline powder. The powder as formed has large particles. A thermal gravimetric analysis test provides a weight loss curve (a) as shown in FIG. 4a. The conductive polyaniline powder is further analysed via a Fourier-transform infrared analysis (FTIR) and the results are shown in terms of curve (a) in FIG. 5.

A Second Batch Polymerization with the Recycled Acidic Aqueous Solution

Figure 4B:
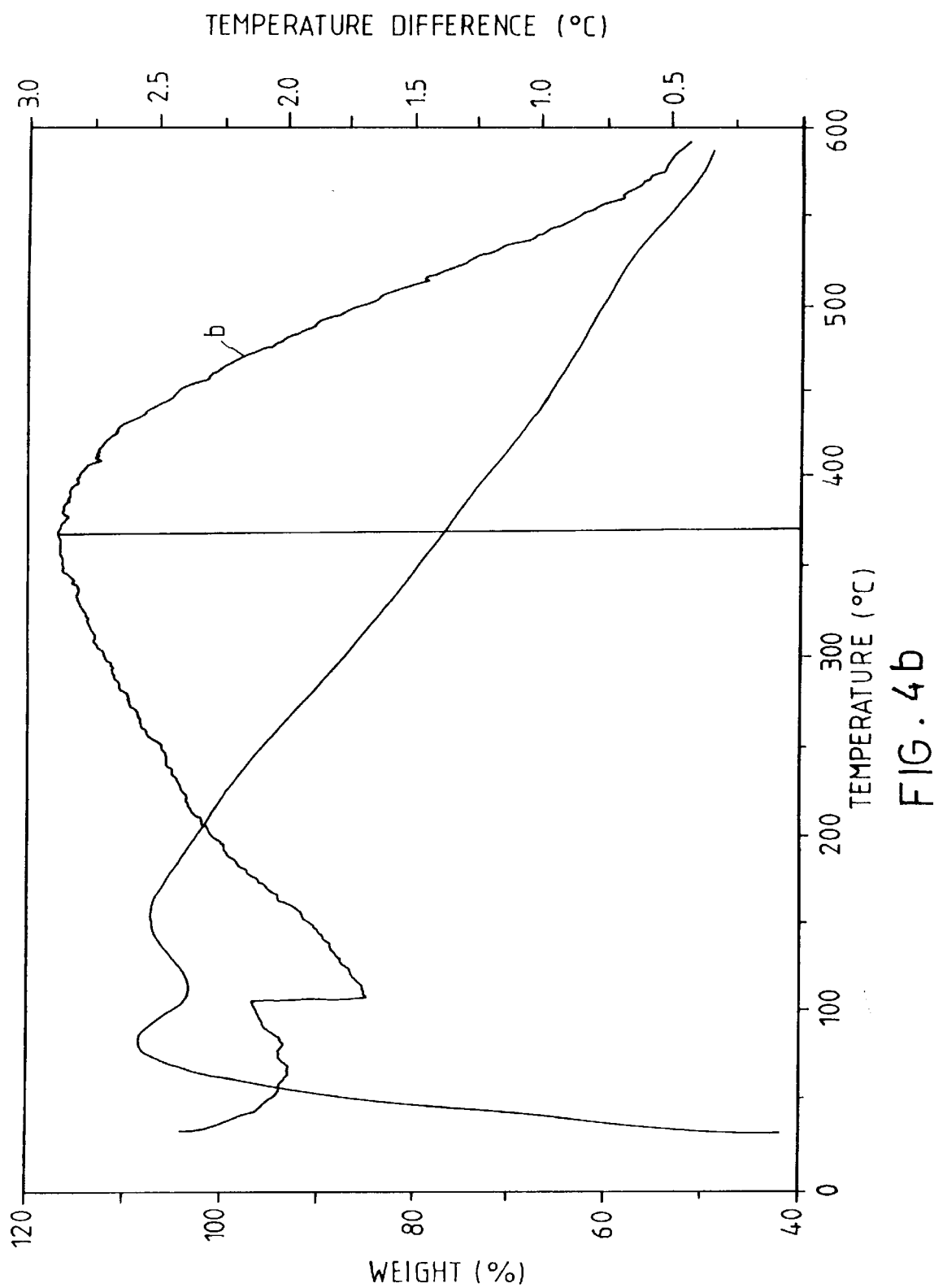

The acidic aqueous solution obtained from the first batch polymerization was returned to the reactor to be mixed with a second batch reactant feed which contains 10 parts by weight of aniline, 30 parts by weight of an HCl solution and 30 parts by weight of ammonium persulfate. The amount of the acid solution used in this second batch is much less than that used in the first batch polymerization. An exothermic polymerization reaction was carried out at room temperature for 2 hours. The resulting polyaniline solid particles were separated from the acidic aqueous solution by filtration, and were then subjected to a neutralizing step, a second filtering step and a drying and forming step to finally form polyaniline powder. As done in the first batch polymerization, the acidic aqueous solution was returned to the reactor again for use in a third batch of polymerization. The particle size of the polyaniline powder obtained in this batch is smaller than that obtained in the first batch. When the polyaniline powder produced in this second batch is subjected to a thermal gravimetric analysis (TGA) test, a weight loss curve (b) is obtained as shown in FIG. 4b. The curve (b) in FIG. 5 shows the results of an FTIR analysis of the resulting powder.

A Third Batch Polymerization with the Recycled Aqueous Solution

Figure 4C:
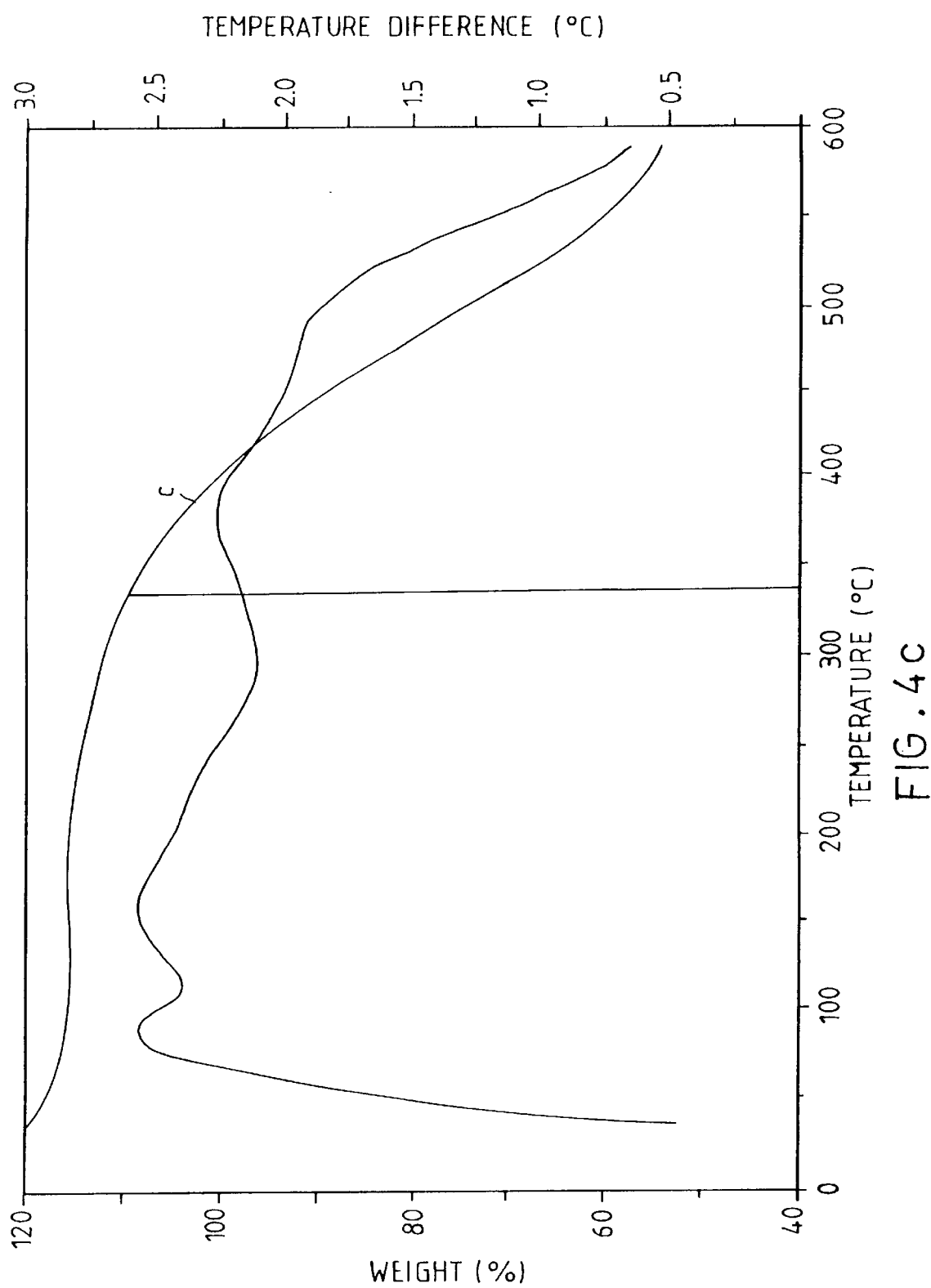

The acidic aqueous solution obtained in the second batch polymerization was returned to the reactor to be mixed with a third batch reactant feed which contains 10 parts by weight of aniline, 30 parts by weight of the HCl solution and 30 parts by weight of ammonium persulfate. The amount of the acid solution used in this third batch is much less than that used in the second batch polymerization. Like the first and second batch polymerization, the resulting polyaniline solid particles in the third batch polymerization were separated from the acidic aqueous solution by filtration, and were then subjected to a neutralizing step, a second filtering step and a drying and forming step to finally form polyaniline powder. The particle size of the powder decreases further and is smaller than that obtained in the second batch. The acidic aqueous solution formed in the third batch was again returned to the reactor for the next batch polymerization. A weight loss diagram is obtained from a TGA test as shown in FIG. 4c, and the curve (c) shown in FIG. 5 is obtained from an FTIR analysis of the powder.

The Hundredth Batch Polymerization with the Recycled Acidic Aqueous Solution

Figure 4D:
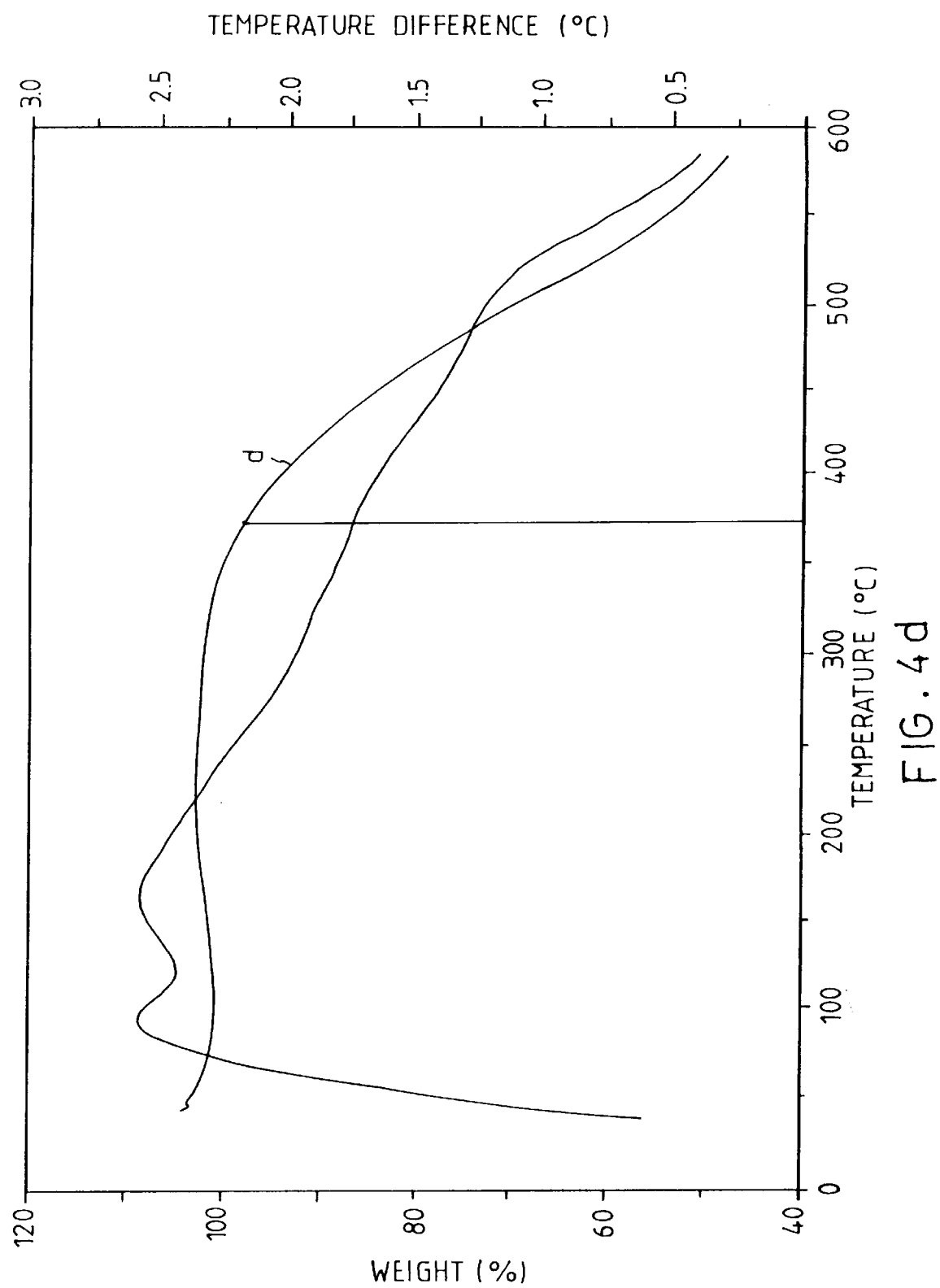
Figure 6:
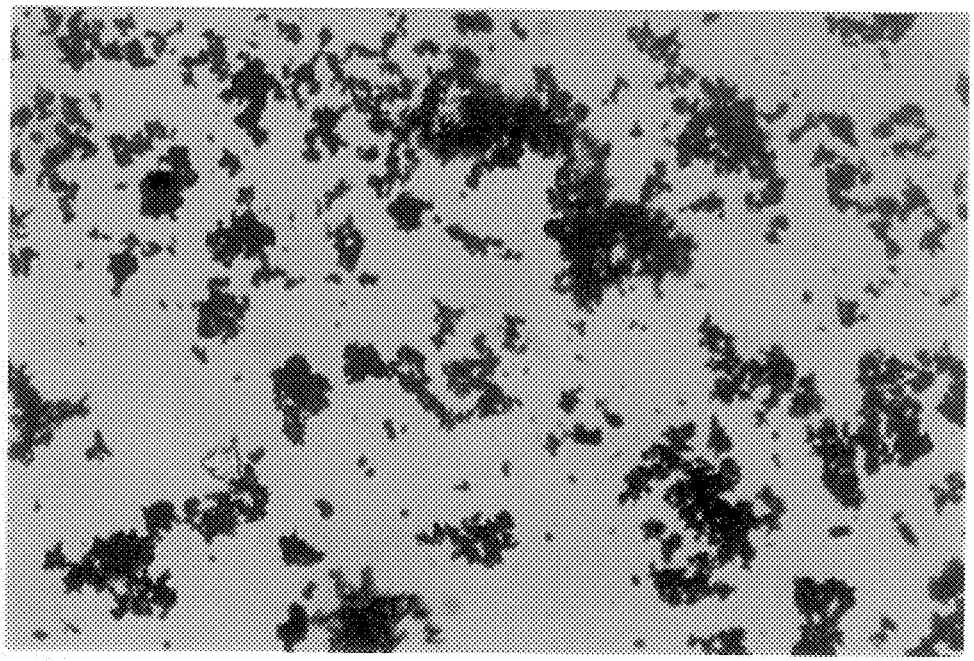
FIG. 6 shows the particle size of the product produced by the conventional process.
Figure 7:
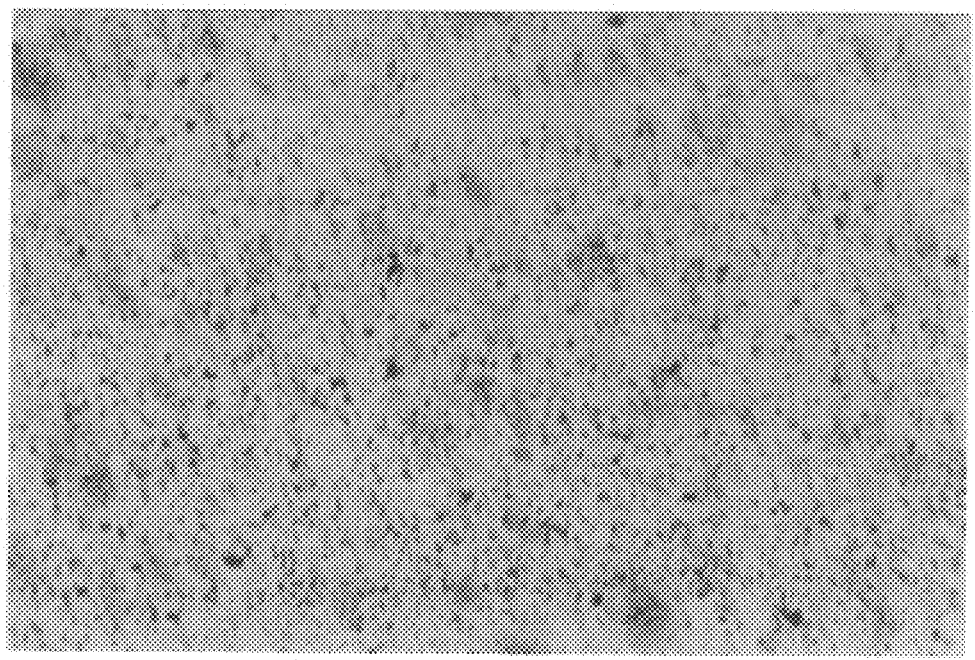
FIG. 7 shows the particle size of the produce of the present invention.

The aqueous solution produced in the first batch polymerization was reused again and again until the hundredth batch polymerization was carried out. In this batch, the added amount of the acid solution was considerably reduced. The same processing steps were performed in this batch of polymerization. The particle size of the resulting powder was reduced considerably as shown in FIG. 7, as compared to the particle size of the powder produced by the conventional process as shown in FIG. 6. Curve (d) in FIG. 4d and curve (d) in FIG. 5 show the results of the TGA test and the FTIR test for the resulting powder.

From the weight loss curves (a), (b) (c) and (d) of the TGA tests shown in FIGS. 4a, 4b, 4c and 4d, it is observed that heat could influence the conductive polyaniline powder and that the weight of the powder is reduced upon overheating. However, since all the curves show that the weights of the powders begin to lose at about 370° C., it can be seen that repeated recycling of the acidic aqueous solution produced during the aniline polymerization does not significantly affect the heat-resisting property of the polymerized products. Furthermore, since all of the curves (a), (b), (c), and (d) of the FTIR analysis shown in FIG. 5 do not differ in terms of their absorption peaks, this ensures that the polyaniline powders resulting from the first, second, third and hundredth batches of polymerization have substantially the same chemical characteristics. In view of these results, it is evident that repeated recycling of the aqueous components produced during the aniline polymerization do not significantly affect the characteristics of the polyaniline powder. Moreover, the powder as produced has a small particle size which is advantageous for preparing a conductive paint from the powder.

Additional advantages of the process according to the present invention are as follows:

Since the reaction temperature of the polymerization process according to the present invention need not be controlled within 0–5° C., the process can be controlled easily although the yield of the powder product is slightly lowered because of the by-product resulting from the temperature elevation.

Since the acidic aqueous solution which is usually discarded as wastewater in the conventional process, is recycled according to the present invention, the unreacted acid solution and monomers contained in the aqueous solution are reused, thereby removing the toxic materials from the wastewater and alleviating the pollution problems encountered with the conventional process.

Because the process according to the present invention is carried out at room temperature without using any cooling water system, the cost of the equipment for this process is reduced.

The polyaniline powder produced by the process according to the present invention has a smaller particle size as compared to that produced conventionally, thereby facilitating the mixing or blending process for preparing a conductive paint or particles therefrom.

Since the amount of the acid solution to be used can be reduced by reusing the acidic aqueous solution which contains the unreacted acid solution, the cost of the feed materials is reduced as compared to the conventional process.

With the invention thus explained, it is apparent that various modifications and variations can be made without departing from the spirit of the invention. It is therefore intended that the scope of the invention be limited only as indicated in the pending claims.

What we claim is:

1. A wastewater-recyclable polymerization process for producing polyaniline resin comprising:

(a) feeding into a reactor a first amount of an aniline monomer, a first amount of an acid solution and a first amount of an oxidizing agent to undergo polymerization so as to produce polyaniline resin particles;

(b) filtering the polyaniline resin particles from an acidic aqueous solution formed during the polymerization;

(c) neutralizing and drying the polyaniline resin particles to form a powder;

(d) recycling the acidic aqueous solution by returning the acidic aqueous solution into said reactor to mix with a second amount of an aniline monomer, and a second amount of an oxidizing agent; and (e) permitting the aniline monomer to undergo polymerization at room temperature in the presence of the recycled acidic aqueous solution without cooling said reactor.

2. The wastewater-recyclable polymerization process as claimed in claim 1, wherein said aniline monomer is selected from the group consisting of aniline, alkyl-substituted anilines, and alkoxy-substituted anilines, and wherein said alkyl-substituted anilines comprise an alkyl group having from one to three carbon atoms and said alkoxy-substituted anilines comprise an alkoxy group having from one to three carbon atoms.

3. The wastewater-recyclable polymerization process as claimed in claim 1, wherein said acid solution is prepared from a compound selected from the group consisting of hydrochloric acid, sulfuric acid, an alkyl benzene sulfonic acid, benzene sulfonic acid, and an alkyl sulfonic acid.

4. The wastewater-recyclable polymerization process as claimed in claim 1, wherein said oxidizing agent is selected from the group consisting of a salt of persulfuric acid, a salt of sulfuric acid, a salt of iodic acid and ferric chloride.

* * * * *